United States Patent
Faubl

(10) Patent No.: US 6,244,707 B1
(45) Date of Patent: Jun. 12, 2001

(54) UV BLOCKING LENSES AND MATERIAL CONTAINING BENZOTRIAZOLES AND BENZOPHENONES

(75) Inventor: Hermann Faubl, Lake Bluff, IL (US)

(73) Assignee: Wesley Jessen Corporation, Des Plaines, IL (US)

( * ) Notice: Subject to any disclaimer, the term of this patent is extended or adjusted under 35 U.S.C. 154(b) by 0 days.

(21) Appl. No.: 09/121,071

(22) Filed: Jul. 21, 1998

(51) Int. Cl.[7] ................................................. G02C 7/04
(52) U.S. Cl. ........................ 351/160 H; 523/106; 623/6.6
(58) Field of Search ..................... 623/6, 6.6; 351/160 R, 351/160 H; 523/106

(56) References Cited

U.S. PATENT DOCUMENTS

| Re. 33,477 | 12/1990 | Loshaek . |
|---|---|---|
| 2,962,533 | 11/1960 | Hardy et al. . |
| 3,072,585 | 1/1963 | Milionis et al. . |
| 3,133,042 | 5/1964 | Tocker . |
| 3,173,893 | 3/1965 | Fertig et al. . |
| 3,328,491 | 6/1967 | Fertig et al. . |
| 3,399,173 | 8/1968 | Heller . |
| 3,493,539 | 2/1970 | Skoultchi et al. . |
| 4,260,768 | 4/1981 | Lorenz et al. . |
| 4,310,687 | 1/1982 | Barabas et al. . |
| 4,321,396 | 3/1982 | Lorenz et al. . |
| 4,390,676 | 6/1983 | Loshaek . |
| 4,508,882 | 4/1985 | Yoshida et al. . |
| 4,528,311 | 7/1985 | Beard et al. . |
| 4,636,212 | 1/1987 | Posin . |
| 4,652,656 | 3/1987 | Besecke et al. . |
| 4,716,234 | 12/1987 | Dunks et al. . |
| 4,719,248 | 1/1988 | Bambury et al. . |
| 4,740,070 | 4/1988 | Vance . |
| 4,753,654 | 6/1988 | Posin et al. . |
| 4,783,361 | 11/1988 | Ovshinsky et al. . |
| 4,795,461 | 1/1989 | Lindqvist et al. . |
| 4,845,180 | 7/1989 | Henry et al. . |
| 4,853,374 | 8/1989 | Allen . |
| 4,868,251 | * 9/1989 | Reich et al. ..................... 525/479 |
| 4,872,877 | 10/1989 | Tiffany . |
| 4,892,915 | 1/1990 | Slongo et al. . |

(List continued on next page.)

FOREIGN PATENT DOCUMENTS 8-29741  2/1996  (JP) .

OTHER PUBLICATIONS

Derwent Abstract No. 1996–143045 of Japanese patent JP 08028741A published Feb. 2, 1996.
J. Belusa et al., Chem. zvesti, 28, pp. 673–679 (1974).
J. Belusa et al., Chem. zvesti, 28, pp. 680–685 (1974).
Gordon, Kir–Othmer Encyclopedia of Technology, pp. 115–122 (2nd Ed. 1970).
Dai et al., Polymer Bulletin, 20, pp. 67–74 (1988).
Jiang et al., Polymer Bulletin, 20, pp. 161–168 (1988).
Liu et al., Polymer Bulletin, A20 pp. 59–66 (1988).
Fertig et al., Journal of Applied Polymer Science, vol. 10, pp. 663–672 (1966).
UVC Brochure, Guaranteed Plastic Lenses, pp. 277–280, undated document.
Li, S.J. et al., J. Macromol. Sci.–Chem., A20(3), pp. 309–320 (1983).

*Primary Examiner*—Paul B. Prebilic
(74) *Attorney, Agent, or Firm*—Brinks Hofer Gilso & Lione

(57) ABSTRACT

Contact lenses, intraocular lenses and transparent plastic with enhanced UV blocking to meet ANSI Class 1 specifications include enhanced effective amounts of two different UV absorbing compounds. One UV absorber is a benzotriazole derivative, and the other UV absorber is a benzophenone derivative. The lenses are made from a polymer that incorporates both of these UV absorbers.

21 Claims, 1 Drawing Sheet

U.S. PATENT DOCUMENTS

| | | |
|---|---|---|
| 4,929,250 | 5/1990 | Hung et al. . |
| 4,963,160 | 10/1990 | Hung et al. . |
| 5,002,979 | 3/1991 | Stoyan . |
| 5,036,115 | 7/1991 | Gallas . |
| 5,084,537 | 1/1992 | Stoyan . |
| 5,098,445 | 3/1992 | Hung et al. . |
| 5,099,027 | 3/1992 | Vogl et al. . |
| 5,106,930 | 4/1992 | Gupta . |
| 5,133,745 | 7/1992 | Falcetta et al. . |
| 5,135,965 | 8/1992 | Tahan . |
| 5,147,396 | 9/1992 | Kageyama et al. . |
| 5,147,902 | 9/1992 | Ichikawa et al. . |
| 5,162,825 | 11/1992 | Kamekura et al. . |
| 5,164,462 | 11/1992 | Yang . |
| 5,187,207 | 2/1993 | Gallas . |
| 5,194,456 | 3/1993 | Gupta . |
| 5,194,544 | 3/1993 | Goldberg et al. . |
| 5,235,358 | 8/1993 | Mutzhas et al. . |
| 5,252,628 | 10/1993 | Chirila et al. . |
| 5,374,663 | 12/1994 | Daicho et al. . |
| 5,403,901 | 4/1995 | Namdaran et al. . |
| 5,416,132 | 5/1995 | Yokoyama et al. . |
| 5,480,927 | 1/1996 | Janssen et al. . |
| 5,500,024 | 3/1996 | Hung et al. . |
| 5,637,726 | 6/1997 | Collins et al. . |
| 5,910,537 * | 6/1999 | Feingold et al. .................. 525/64 |

* cited by examiner

FIG. I
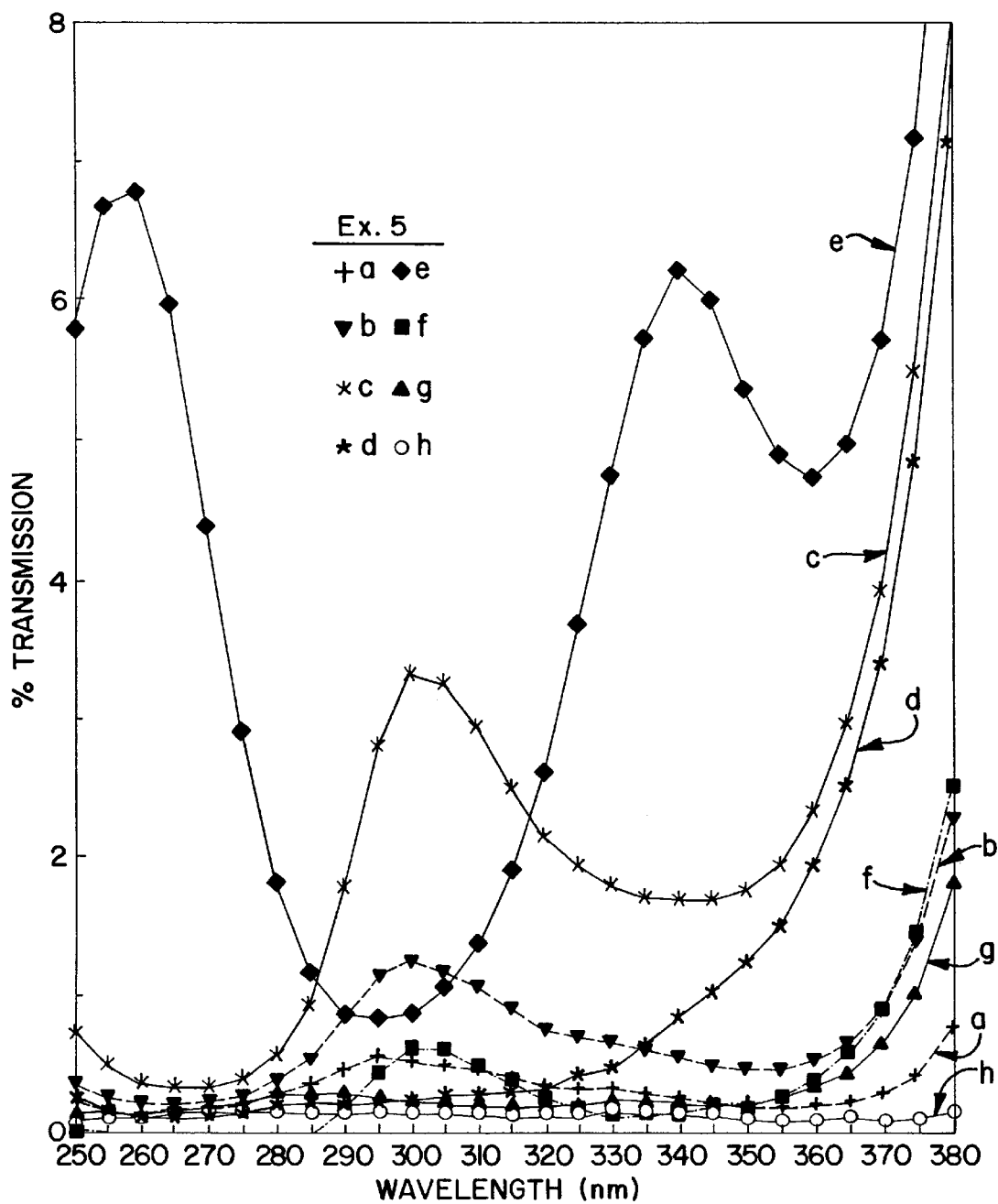

UV BLOCKING LENSES AND MATERIAL CONTAINING BENZOTRIAZOLES AND BENZOPHENONES

BACKGROUND OF THE INVENTION

This invention relates to transparent plastic materials for optical use, and particularly to ocular devices which absorb ultraviolet radiation, and to their production from ultraviolet absorbing compounds, such as by copolymerizing the compounds with suitable reactive monomers.

Contact lenses containing compounds for blocking ultraviolet ("UV") light have been on the market for several years. Such lenses are useful to all who live in areas where bright sunlight is common. As UV radiation is likely to be a cause of cataracts and senile macular degeneration, everyone who wears contact lenses can benefit from the type which block this radiation. Younger persons, whose eye lenses transmit more ultraviolet radiation than do those of older persons, also should be concerned with providing additional protection.

Ultraviolet blocking lenses are especially useful for those who have had the natural lens of the eye removed, since the natural lens has UV absorption properties that help to protect the interior of the eye. Hence, UV absorbing intraocular lenses (IOLs) are also highly desirable, since such lenses are implanted in place of the eye's natural lens.

Loshaek discovered the use of polymerizable UV absorbing compounds for producing contact and intraocular lenses in the early 1970's, e.g., as shown in U.S. Pat. No. Re. 33,477. More recently, substituted 2-phenyl benzotriazole compounds having a polymerizable acrylic group have been used to produce contact lenses, e.g., as in U.S. Pat. No. 4,716,234 to Dunks et al. The UV absorption technology has been applied primarily to rigid, gas permeable lenses; most commercially available soft lenses do not contain UV absorbers.

Hydrogels are desirable for use in lenses, particularly IOLs. However, because of their hydrophilic nature and expanded structure, it has been difficult to incorporate UV absorbing compounds into hydrogels. Prior art UV absorbers are generally hydrophobic and have limited solubility in hydrogels. Due in part to this limited solubility, it has been difficult to copolymerize UV absorbers with hydrogel forming monomers. UV absorbers are preferably copolymerized, rather than physically entrapped within the hydrogel, to prevent the absorber from being leached out of the UV absorbing hydrogel when the hydrogel is in the aqueous environment of the eye or stored in solution.

In addition to problems of incorporation of UV absorbers into hydrogels, UV absorbers having the required characteristics such as UV absorption between 300–400 nm and hydrolytic stability have been difficult to synthesize.

Recently, Collins, et al. discovered a new class of benzotriazoles that are useful in soft contact lenses, as shown in U.S. Pat. No. 5,637,726. The compounds absorb UV light very well at the upper end of the UV spectrum. These benzotriazoles copolymerize well into hydrogel polymers without the problems of leaching out. Also, effective amounts of these benzotriazoles incorporated into the contact lens polymer do not negatively affect the properties of the polymer. Also, these compounds increase the refractive index and optic potential of the contact lenses, allowing for thinner lenses with enhanced oxygen permeability. These compounds also have a higher cut-off, up to 400 nm, to block more light in the UVA range.

While contact lenses containing a UV absorbing compound are now commercially available, these lenses do not block all of the UV light from entering the eye, and typically only block about 90% of the entire UV range. The UV range is generally broken in to two subranges, known as UVA and UVB. ANSI Class 1 specifications for UV absorption require an average percent transmittance of less than 1.0% at 280–315 nm (UVB range) and only less than 10% at 316–380 nm (UVA range). Commercially available UV absorbing contact lenses do not meet this standard.

The difficulty in obtaining a UV blocking contact lens that meets Class 1 standards by using a benzotriazole, as described by Collins et al., is that one has to use so much benzotriazole that the lens also absorbs significant amount of light at the upper end of the UVA range and into the visible light range. This results in an observable yellowish tint in the contact lens, which is not appealing to consumers. More importantly, this yellowish tint throws off the cosmetic appearance of colored contact lenses. In addition, too much benzotriazole, or other UV absorbing compound, can adversely affect the properties of the lens polymer, such as durability, flexibility, hydrophilicity, stability to sterilizing regimes, etc. Also, the compound may be present in too high quantities for all of it to covalently bond with the other monomers during the polymerization, resulting in excessive residual monomer content that may gradually leach out during use.

Hung et al., U.S. Pat. No. 4,963,160, proposes a solution to some of these problems by bonding two different UV absorbing compounds that each have a different UV absorbing spectra onto a triazine derivative, which is then applied as a coating onto a polymeric lens. The UV absorbers are preferably selected to provide a UV absorbing agent with the broadest UV absorption range possible. Hung et al. disclosed embodiments of these UV absorbing agents that include p-aminobenzoic acid and a benzotriazole, or p-aminobenzoic acid and a benzophenone. The use of this UV absorbing agent has certain limitations because the UV absorbing compounds can only be used in a one-to-one mole ratio, so that the UV absorption spectra of the lens cannot be optimized. Also, there are difficulties to achieve consistent coating thicknesses.

SUMMARY OF THE INVENTION

The present invention overcomes some of these problems unsolved by prior art UV blocking lenses by providing a plastic material, preferably in the form a of an ocular device such as a contact lens or an intraocular lens, comprising a polymer formed by incorporating one or more monomers suitable for use in making such lenses, and effective amounts of a combination of a first ultraviolet absorber and a second ultraviolet absorber, wherein the first UV absorber is a benzotriazole compound represented by the formula:

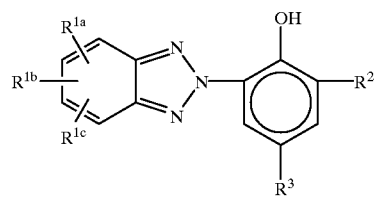

where $R^{1a}$, $R^{1b}$, and $R^{1c}$ are independently hydrogen, halogen, $C_1$–$C_6$ straight or branched chain alkoxy group, aryl or substituted aryl; $R^2$ is hydrogen, lower alkyl, preferably tert-butyl, aryl or substituted aryl; $R^3$ is hydrogen, lower alkyl, aryl, substituted aryl, or $R^4$—$R^5$—$R^6$, where $R^4$ is an oxygen or is absent; $R^5$ is a linking group selected from $-(CH_2)_nO-$, $-CH(CH_3)CH_2O-$, $-CH_2CH(CH_3)O-$, $-(CH_2)_nOCH_2-$, $-CH(CH_3)CH_2OCH_2-$, or $-CH_2CH(CH_3)OCH_2-$ group, or is absent; $R^6$ is acrylate, methacrylate, styrene or vinyl; and n is 2 or 3;

and wherein the second UV absorber is a substituted 2-hydroxy-benzophenone according to the formula:

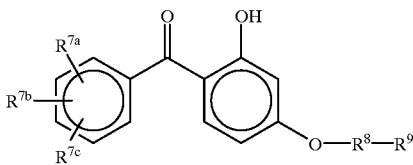

where $R^{7a}$, $R^{7b}$, and $R^{7c}$ are independently hydrogen, halogen, $C_1$–$C_6$ straight or branched chain alkoxy group, aryl or substituted aryl; $R^8$ is a linking group selected from alkyl, $-(CH_2)_mO-$, $-CH(CH_3)CH_2O-$, $-CH_2CH(CH_3)O-$, $-(CH_2)_mOCH_2-$, $-CH(CH_3)CH_2OCH_2-$, or $-CH_2CH(CH_3)OCH_2-$ group, or is absent; and $R^9$ is alkyl, acrylate, methacrylate, styrene or vinyl; and m is 2 or 3.

Other aspects and advantages of the present invention will be apparent from the following detailed description.

BRIEF DESCRIPTION OF THE DRAWING

FIG. 1 shows the UV transmission spectra from the formulations of Example 5.

DETAILED DESCRIPTION OF THE DRAWING AND PREFERRED EMBODIMENTS OF THE INVENTION

In the following description and claims, the term "percent" will be used to represent percentage by weight, unless the context indicates otherwise.

Ocular devices contemplated in connection with the present invention include, without limitation, windows, lenses for eyeglasses and instruments such as binoculars, goggles, face shields, contact lenses, intraocular lenses and the like. Contact lenses can include both those for correcting defective visual acuity and the so-called "bandage lenses" which are used in treating eye disorders, as well as the purely cosmetic lenses used for purposes such as changing the apparent eye color.

For convenience, the following acronyms and abbreviations are used to describe the below-identified compounds, unless otherwise noted:
A. UV Absorbing Compounds
  1. BZT
     2-(2'-hydroxy-3'-tert-butyl-5'-(3"-(4'"-vinylbenzoxy)propoxy)phenyl)-5-methoxy-2H-benzotrizole; $C_{29}H_{33}N_3O_4$
  2. UVAM
     2-(2'-hydroxy-3'-tert-butyl-5'-vinylphenyl)-5-chloro-2H-benzotrizole; $C_{18}H_{18}ClN_3O$
  3. BP
     2-hydroxy-4-acryloxyethoxy-benzophenone; $C_{18}H_{16}O_5$
  4. MBP
     2-hydroxy-4-methoxy-benzophenone; $C_{14}H_{12}O_3$
B. Lens Monomers and Structures
  1. HEMA; Hydroxyethyl methacrylate; $C_6H_{10}O_3$ $CH_2=C(CH_3)CO_2CH_2CH_2OH$
  2. EOEMA; Ethoxyethyl methacrylate; $C_8H_{14}O_3$ $CH_2=C(CH_3)CO_2CH_2CH_2OCH_2CH_3$
  3. EDMA; Ethyleneglycol dimethacrylate; $C_{10}H_{14}O_4$ $[CH_2=C(CH_3)CO_2CH_2-]_2$
  4. MAA; Methacrylic acid; $C_4H_6O_2$ $CH_2=C(CH_3)CO_2H$
  5. NVP; N-vinyl pyrrolidone; $C_6H_9NO$ $(CH_2)_3C(O)N-CH=CH_2$
  6. AMA; Allyl methacrylate; $C_7H_{10}O_2$ $CH_2=C(CH_3)CO_2CH_2CH=CH_2$
  7. MMA; Methyl methacrylate; $C_5H_8O_2$ $CH_2=C(CH_3)CO_2CH_3$
  8. DMA; N,N-Dimethylacrylamide; $C_5H_9NO$ $CH_2=CHC(O)N(CH_3)_2$
  9. GMA; Glyceryl methacrylate; $C_6H_{12}O_4$ $CH_2=C(CH_3)CO_2CH_2CH(OH)CH_2OH$
  10. TEGDMA; Tetraethylene glycol dimethacrylate, $CH_2=C(CH_3)COOCH_2(CH_2OCH_2)_3CH_2OOC(CH_3)C=CH_2$
  11. Polymerization initiators
     VAZO 64; 2,2'-azobis(2-methylpropanenitrile); $C_8H_{12}N_4$ $[C(CH_3)_2(CN)-N=]_2$
     VAZO 52; 2,2'-azobis(2,4-dimethylpentanenitrile); $C_{14}H_{24}N_4$ $[C(C_4H_9)(CH_3)(CN)-N=]_2$
     tBPP; t-Butyl peroxypivalate; $C_9H_{12}O_3$ $(CH_3)CO_2C(O)C(CH_3)_3$
     IPP; Isopropylperoxydicarbonate; $C_8H_{14}O_6$ $[(CH_3)_2CHOC(O)O-]_2$ The present invention includes a contact lens, intraocular lens, or an optical quality plastic comprising a polymer formed by incorporating one or more monomers suitable for use in making such lenses, and effective amounts of a first ultraviolet absorber and a second ultraviolet absorber to provide amounts of UV absorption to meet ANSI Class 1 specifications without creating an observable yellowish tint to the lens, wherein the first UV absorber is a benzotriazole compound represented by the formula:

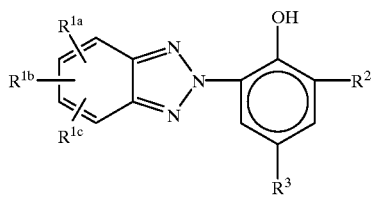

where $R^{1a}$, $R^{1b}$, and $R^{1c}$ are independently hydrogen, halogen, $C_1$–$C_6$ straight or branched chain alkoxy group, aryl or substituted aryl; $R^2$ is hydrogen, lower alkyl, preferably tert-butyl, aryl or substituted aryl; $R^3$ is hydrogen, lower alkyl, aryl, substituted aryl, or $R^4-R^5-R^6$, where $R^4$ is an oxygen or is absent, $R^5$ is a linking group selected from $-(CH_2)_nO-$, $-CH(CH_3)CH_2O-$, $-CH_2CH(CH_3)O-$, $-(CH_2)_nOCH_2-$, $-CH(CH_3)CH_2OCH_2-$, or $-CH_2CH(CH_3)OCH_2-$ group, or is absent; $R^6$ is acrylate, methacrylate, styrene or vinyl; and n is 2 or 3;

and wherein the second UV absorber is a substituted 2-hydroxy-benzophenone according to the formula:

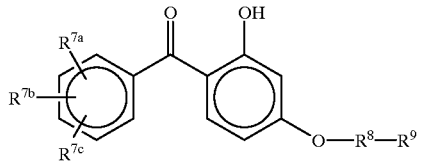

where $R^{7a}$, $R^{7b}$, and $R^{7c}$ are independently hydrogen, halogen, $C_1$–$C_6$ straight or branched chain alkoxy group, aryl or substituted aryl; $R^8$ is a linking group selected from alkyl, —$(CH_2)_mO$—, —$CH(CH_3)CH_2O$—, —$CH_2CH(CH_3)O$—, —$(CH_2)_mOCH_2$—, —$CH(CH_3)CH_2OCH_2$—, or —$CH_2CH(CH_3)OCH_2$— group, or is absent; and $R^9$ is alkyl, acrylate, methacrylate, styrene or vinyl; and m is 2 or 3.

For the first UV absorber, the benzotriazole derivatives, preferred substituent groups for $R^1$ are H, Cl and $CH_3O$—, more preferably $CH_3O$—. Preferably, $R^{1a}$ and $R^{1c}$ are hydrogen when $R^{1b}$ is methoxy. The preferred substituent group for $R^2$ is tert-butyl. $R^3$ is preferably oxygen. $R^4$ is preferably oxygen. $R^5$ is preferably selected from —$(CH_2)_3OCH_2$— and —$(CH_2)_2OCH_2$—, more preferably $R^5$ is —$(CH_2)_3OCH_2$—. $R^6$ is preferably methacrylate or styrene. The more preferred compound is one wherein $R^1$ is $CH_3O$—; $R^2$ is —$C(CH_3)_3$; $R^4$ is O; $R^5$ is —$(CH_2)_3OCH_2$—; and $R^6$ is styrene. The aryl group may optionally be substituted with halogen, alkyl, halogenated alkyl, alkoxy, alkenyl, alkynyl, and amino groups.

Generally, benzotriazole derivatives that have UV absorbing qualities comparable to those described specifically in this application, may be useful alternatives to those defined by this invention. One skilled in the art may be able to find or synthesize such compounds and apply them in accordance with the teaching of this invention without undue experimentation.

A preferred class of benzotriazole compounds are represented by the formula:

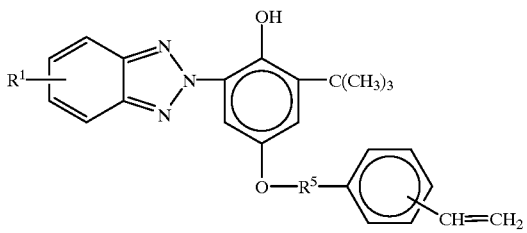

where $R^1$ and $R^5$ are as defined above.

Specifically, some of the preferred benzotriazole compounds of this invention are prepared following the procedures described in U.S. Pat. No. 5,637,726, to Collins et al., incorporated herein by reference. For example, reacting a vinylbenzyl chloride with a 2-[2'-hydroxy-5'-(gamma-hydroxyalkoxy)-3'-t-butylphenyl]-5-(alkoxy [or halo])-2H-benzotriazole one obtains the compound of the above formula. The starting benzotriazole can be prepared by the method described in Examples 1–3 of U.S. Pat. No. 4,716,234 to Dunks et al., which is incorporated herein by reference, substituting 4-halo-2-nitroaniline for the 4-methoxy-2-nitroaniline when it is desired to make a halogen group, and using any of 3-chloro-1-propanol, 2-chloroethanol, 2-chloro-1-propanol or 1-chloro-2-propanol to produce the desired group for $R^2$. Those skilled in the art will be aware of other groups which can be substituted for these chloro groups, such as other halogens, and for groups such as methoxy. By appropriate choice of the substituted nitroaniline, $R^1$ can be made to occupy ring positions other than that shown in the above structural formula.

Alternatively, the first UV absorbing compound may preferably be a benzotriazole derivative represented by the formula:

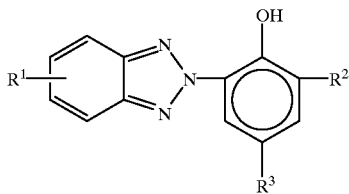

where $R^1$ is a hydrogen, halogen or lower alkoxy; $R^2$ and $R^3$ are independently hydrogen or lower alkyl. Preferably, $R^1$ is halogen, with chlorine being more preferred. Preferably, $R^2$ and $R^3$ are independently hydrogen, methyl or tert-butyl. More preferably, $R^2$ is tert-butyl. The non-polymerizable benzotriazole derivative of this formula is preferably used for rigid gas permeable contact lenses. A preferred compound is 2-(2'-hydroxy-3'-tert-butyl-5'-methyl-phenyl)-5-chlorobenzotriazole, which is manufactured by Ceiba-Geigy Corp., and commercially available under the trademark TINUVIN-326.

For the second UV absorbers, the benzophenone compounds, preferably $R^7$ is hydrogen, halogen or alkoxy. More preferably, $R^7$ is hydrogen or p is zero. $R^8$ is preferably alkyl, —$(CH_2)_nO$—, or absent. $R^9$ is preferably is alkyl, acrylate, or methacrylate. The second UV absorbers are selected from the group exemplified by 2-hydroxy-4-acryloxyethoxy-benzophenone, 2-hydroxy-4-methacryloxy-benzophenone, and 2-hydroxy-4-methoxy-benzophenone. More preferably, the selected compounds are 2-hydroxy-4-acryloxyethoxy-benzophenone or 2-hydroxy-4-methacryloxy-benzophenone. Most preferably, 2-hydroxy-4-acryloxyethoxy-benzophenone is selected for use in hydrogel lenses. For rigid gas permeable contact lenses or other rigid plastics, it is preferred to use 2-hydroxy-4-methoxy-benzophenone. These compounds are well-known and described, and are either commercially available or easily synthesized.

Typically, useful amounts of the UV absorbing compounds in a polymer range from about 0.01 percent to about 25 percent, depending upon the intended use for the polymer. In general, it will be desirable to minimize the amount of compound used, so that the physical and chemical properties of the base polymer (other than UV absorption) will not be significantly or detrimentally effected. For contact and intraocular lenses made primarily from acrylate and methacrylate polymers, about 0.05 to about 10 percent of UV absorbers can be used. For creating lenses that meet Class 1 specifications and do not have observable yellowish tints, less than 0.4 percent of the first UV absorbing compound (benzotriazole) may be used. The preferred total amounts of UV absorbers are between about 0.8 and about 3.0 percent, with between about 1.0 and about 2.0 percent being more preferred. The desired ratio of the amount of the first UV absorber to the second UV absorber (e.g. BZT:BP) is between about 5:1 and about 1:3, preferably between about 3:1 and 1:3.

The amounts of the individual UV absorbing compounds used depend on the polymer base, thickness of the lens, water or solids content and desired level of UV absorption. The preferred amounts will, of course, vary depending upon the water content and thickness of the lenses. For example, a lens that is twice as thick will need only half the concentration of UV absorber, assuming its water content is the same. On the other hand, a lens twice as thick with doubled water content will require the same concentration of UV absorber.

In practice, the first and second UV absorbers are present in amounts to provide an enhanced reduction in the level of UV transmission compared to the level of UV transmission than can be achieved by using the same total amount of one UV absorbing compound alone. In other words, the two UV absorbing compounds in combination enhance the total effective UV light blockage. Greater blocking of UV light can be achieved using lesser total amounts of the combination of BZT and BP than using a like amount of either BZT or BP alone.

The UV absorbing compounds can be copolymerized with a large number of unsaturated and other monomers to produce polymers having enhanced UV blocking properties. Representative useful monomers include, without limitation:

(a) olefins, either straight- or branched-chain, including ethylene, propene, butenes, pentenes and the like;

(b) dienes, such as butadiene, and trienes;

(c) styrene and substituted styrenes;

(d) silanes;

(e) halogen-containing vinyl or vinylidene compounds, vinyl alcohols or esters, and the like;

(f) acrylic and methacrylic acids, esters, amides, nitrites and the like;

(g) silicon substituted alkyl or aryl acrylic or methacrylic esters, including alkyl silicates;

(h) fluorinated alkyl or aryl substituted acrylic or methacrylic esters;

(i) vinyl pyrrolidones;

(j) vinyl silanes;

(k) vinyl sulfones;

(l) reactive mixtures of polyamines or polyhydroxy compounds and polybasic acids;

(m) epoxides, alkylene oxides or ethers;

(n) alkylidene or phenylene oxides;

(o) reactive mixtures of carboxylic or carbonic acids and polyhydroxy compounds; and (p) reactive mixtures of isocyanates and polyhydroxy compounds.

Those skilled in the art will recognize that various of the monomers and reactive mixtures listed above, as well as others, can be copolymerized, and that the compounds of this invention can be used to form UV absorbing polymers with such mixtures of monomers. Copolymers which are formed may be random, block or grafted polymers.

In addition to incorporating the compounds into polymers by copolymerization, it is possible to form a new UV absorbing polymer structure by condensing or otherwise coupling absorbing compounds with a polymerized material having pendant reactive groups, or to form a UV absorbing polymer by physically dispersing the compounds as additives in a formed polymer, e.g., adding a compound to a polymer melt, provided that the ratio of the different UV absorbing compounds in the polymer can be adjusted to achieve the desired enhanced UV blocking.

Hydrogels for use in contact lenses or IOLs ideally should contain a UV absorbing compound. This is particularly the case when the lens is to be used to replace the natural lens of the eye lost to injury or disease. The present invention is directed to UV absorbing hydrogels having the following characteristics.

First, the UV absorbing monomer of the UV blocking hydrogel should block UV radiation between about 300–400 nm, because the purpose of incorporating a UV absorber into a hydrogel is to prevent transmittance of UV radiation to the retina. As previously discussed, this function is normally performed by the eye's natural lens, which, however, is damaged by UV radiation. Although the UV blocking hydrogel should block UV radiation between about 300 to 400 nm, it is desirable that absorbance sharply decrease above 400 nm. If absorbance does not sharply decrease above 400 nm, the UV absorbing hydrogel will take on a significant yellow tint. In some cases, however, some yellow tint may be desired. For example, it has been thought that increased light absorbance in this range by spectacles, goggles, contact lenses, etc., enhances visual acuity.

Second, it is desirable to incorporate a UV absorbing monomer into the hydrogel at the lowest concentration possible in order to minimize the impact of the compound on the structure of the hydrogel. Hydrogels are particularly susceptible to being adversely affected by the addition of other compounds due to their expanded structure. Most UV absorbing monomers with good UV absorbing characteristics are more hydrophobic than hydrogel-forming monomers. The addition of any significant amount of a UV absorbing monomer to a hydrogel forming monomer decreases the water content of the resulting UV absorbing hydrogel. This can adversely impact the desirable properties of the hydrogel. Therefore, it is desirable to use at least two different UV absorbing compounds which in combination have an enhanced effective blocking of UV radiation, thereby minimizing the concentration of absorber required.

Third, it is important the UV absorbing hydrogel be stable as a copolymer and in particular exhibit long-term hydrolytic stability. This is a particularly important requirement when the hydrogel is to be used as an IOL and surgically implanted within the eye, since IOLs are generally intended to remain in the eye indefinitely.

Fourth, the UV absorbing compound to be incorporated into the hydrogel must be soluble in the hydrogel-forming monomer so that it can be copolymerized with the hydrogel-forming monomer. It is necessary that the UV absorber be copolymerized with the hydrogel-forming monomer due to the expanded nature of hydrogels. Because of this expanded structure it is impractical to rely on imbedding or dispersing UV-absorbing compounds within the hydrogel as can be done with rigid-gas-permeable (RGP) type lenses. Moreover, copolymerization prevents the UV absorber from being leached from the hydrogel while in the eye or in a storage solution. At a minimum, the UV absorbing monomer should be soluble in the hydrogel forming monomer in an amount sufficient to provide the desired degree of UV absorbance in the UV blocking hydrogel.

Ocular devices or UV blocking optical plastics, in accordance with the invention, may be produced by incorporating a first UV absorbing compound, a second UV absorbing compound, and at least one monomeric compound suitable for producing an ocular device, preferably in the case of contact and intraocular lenses, hydroxyethyl methacrylate, N-vinyl pyrrolidone, alkyl methacrylates such as methyl methacrylate, aryl methacrylates, silicone methacrylate, glyceryl methacrylate, fluorinated methacrylates, alkyl substituted styrene, or combination thereof. Of course, other lens-producing monomers may be used.

Contact and intraocular lenses in accordance with invention may be hydrophilic, hard, or rigid-gas-permeable (RGP), depending on the monomer or combination thereof in which the UV-absorbing compounds of the invention are incorporated. In the case of hard or RGP lenses, it is preferred to have the UV absorbers dispersed in the polymer matrix. In the case of hydrophilic lenses, it is preferred to have the UV absorbers copolymerized with the base lens monomers.

Copolymerization may take place by any of the methods well known within the ocular device industry, e.g., by heat or UV light, or with a suitable initiator. Polymerization temperatures are typically 25° to 140° C., more preferably 30° to 100° C., for 5 minutes to 96 hours, more preferably 1 to 24 hours. Suitable polymerization catalysts include azobisisobutyronitrile, available from E. I. DuPont de Nemours Corporation, Wilmington, Del. U.S.A. as Vazo 64™, 2,2'-azobis (2,4-dimethylpentanenitrile), available from DuPont as Vazo 52™, and 2,5-dimethyl-2,5-bis(2-ethylhexanoylperoxy) hexane, available from Elf-Atochem, Buffalo, N.Y. U.S.A. as Lupersol 256™, as well as other peroxides.

If UV light is used to initiate the polymerization, its intensity should be about 0.1 to about 50 milliwatts per square centimeter, more preferably 1 to 5 mW/cm$^2$. Generally, the time required is from 1 minute to 10 hours, preferably from 5 minutes to 2 hours. The temperature is between about 20 and 50° C., preferably 25–30° C. Light-created radicals are derived from the initiators such as Vazo 52 and the like.

Lenses of the invention may also be produced by first polymerizing a rod of the copolymer, cutting the rod into bonnets or buttons, and machining the bonnets or buttons into lenses, as is well known in the art. If the polymer undergoes a UV cure, the monomer mixture may also be heat cured after exposure to the UV source. Alternatively, the lenses may be produced by any of the known molding or casting techniques, such as the methods referred to by Kindt-Larsen et al. in U.S. Pat. No. 5,039,459. The exact manner used for polymerization and lens shaping is a matter of choice and is not critical to this invention.

The following examples further describe the invention, but are not to be construed as limiting the scope of the invention. Generally, unless otherwise noted, the relative amounts of ingredients are shown on a dry weight basis. In examples where the total ingredients do not total exactly 100 percent or 1.000 fraction, the amount of ingredients should be considered to be approximate relative proportions.

EXAMPLE 1

HEMA Based Class I Lens

| Ingredient | Weight Fraction of Polymer Base |
|---|---|
| HEMA | 0.5788 |
| EOEMA | 0.0647 |
| EDMA | 0.0148 |
| MAA | 0.0106 |
| BZT | 0.0044 |
| BP | 0.0096 |
| IPA (Isopropyl alcohol) | 0.3099 |
| Vazo 52 | 0.0072 |
| TOTAL | 1.0000 |

The hydrated lens had a water content of 53% with a center thickness of 0.083 mm. The average light transmission was %T(280–315 nm) 0.02% and %T(315–380 nm)= 2.2%.

EXAMPLE 2

NVP Based Class I Lens

| Ingredient | Weight Fraction |
|---|---|
| MMA | 0.2954 |
| NVP | 0.6743 |
| AMA | 0.0016 |
| BZT | 0.0063 |
| BP | 0.0136 |
| Vazo 64 | 0.0088 |
| TOTAL | 1.0000 |

The hydrated lens had a water content of 74%

EXAMPLE 3

GMA-Based Class I Lens

| Ingredient | Weight Fraction |
|---|---|
| GMA | 0.6897 |
| MMA | 0.2871 |
| EDMA | 0.0034 |
| BZT | 0.0062 |
| BP | 0.0134 |
| IPP | 0.0002 |
| TOTAL | 1.0000 |

The hydrated lens had a water content of 38%

EXAMPLE 4

GMA/MMA-Based Class I Lens

| Ingredient | Weight Fraction |
|---|---|
| GMA | 0.5282 |
| MMA | 0.4303 |
| Water | 0.0196 |
| EDMA | 0.0010 |
| BZT | 0.0062 |
| BP | 0.0137 |
| tBPP | 0.0010 |
| TOTAL | 1.0000 |

EXAMPLE 5(a–h)

HEMA-Based Lenses

| Ingredient | % Weight | | | | | | | |
|---|---|---|---|---|---|---|---|---|
|  | 5a | 5b | 5c | 5d | 5e | 5f | 5g | 5h |
| HEMA | 52.912 | | | | | | | |
| EOEMA | 05.727 | | | | | | | |
| IPA | 37.00 | | | | | | | |
| EDMA | 01.618 | | | (SAME) | | | | |
| MAA | 1.057 | | | | | | | |
| Vazo-52 | 0.336 | | | | | | | |
| Lupersol 256 | 0.331 | | | | | | | |
| BZT | 1.0 | 0.75 | 0.5 | 0.5 | 0.5 | 0.75 | 0.75 | 1.0 |
| BP* | 0.5 | 0.5 | 0.5 | 0.5 | — | 0.75 | 0.75 | — |
| Methyl-BZT** | — | — | — | 0.5 | 0.5 | — | 0.75 | 1.0 |
| % H$_2$O | 49 | 51 | 50 | 49 | 50 | 48 | 47 | 48 |

-continued

| | % Weight | | | | | | | |
|---|---|---|---|---|---|---|---|---|
| Ingredient | 5a | 5b | 5c | 5d | 5e | 5f | 5g | 5h |
| Avg. % T (280–315 nm) | 0.45 | 0.92 | 2.26 | 0.25 | 1.23 | 0.34 | 0.25 | 0.14 |
| Avg. % T (316–380 nm) | 0.32 | 0.82 | 2.85 | 1.91 | 5.24 | 0.57 | 0.46 | 0.13 |

*2-hydroxy-4-methacryloxy-benzophenone
**2-(2'-(4"-vinylbenzoxy)-5'-methylphenyl)-2H-benzotriazole The solids content of these lenses are shown on a dry basis. The hydrated lenses had a water content as shown in the table. The lenses were made by placing the monomer formulation in to the contact lens mold at 70° C. for 30 minutes, then ramping up to 120° C. over 10 minutes and holding for 30 minutes. The lenses were cooled down and cycled through an autoclave in saline solution.

The UV transmission spectra for the lenses of Examples 5a through 5h are shown in FIG. 1.

EXAMPLE 6(a–d)

| | % Weight | | | |
|---|---|---|---|---|
| Ingredient | 6a | 6b | 6c | 6d |
| MMA | 29.88 | | | |
| NVP | 69.34 | | | |
| AMA | 0.15 | (SAME) | | |
| Vazo 64 | 0.89 | | | |
| BP | 0.90 | 0.90 | 0.90 | 0.90 |
| BZT | 0.40 | 0.80 | — | — |
| UVAM | — | — | 0.80 | 1.60 |
| % H₂O (after hydration) | 77 | 76 | 72 | 68 |
| Avg. % T (280–315 nm) | 5.6 | 4.0 | 1.6 | 0.09 |
| Avg. % T (316–380 nm) | 17.5 | 9.2 | 9.3 | 0.54 |

EXAMPLE 7(a–f)
RGP Lenses

| | % Weight Polymer Base | | | | | |
|---|---|---|---|---|---|---|
| Ingredient | 7a | 7b | 7c | 7d | 7e | 7f |
| TPMD | 40.00 | | | | | |
| MMA | 54.77 | | | | | |
| MAA | 5.00 | (SAME) | | | | |
| TEGDMA | 0.10 | | | | | |
| TBPP | 0.13 | | | | | |
| D&C Green #6 Dye | 0.00715 | | | | | |
| TINUVIN-326 | 0.60 | 0.75 | 0.50 | 0.75 | 0.82 | 0.90 |
| MBP | 0.15 | — | 0.15 | 0.15 | — | — |
| Avg. % T (280–315 nm) | 0.82 | 1.50 | 0.89 | 0.41 | 1.02 | 0.91 |
| Avg. % T (316–380 nm) | 1.09 | 0.39 | 1.17 | 0.34 | 0.23 | 0.15 |

A stock solution of the above polymer base ingredients was prepared, and varying amounts of Tinuvin-326 and MBP were added to separate portions of the polymer base to individually obtain formulae 7a–7f. Rods were filled and warmed at 48° C. for 24 hours; then cured at 110° C. for 24 hours. The rods were annealed by ramping the temperature to 110° C. over 2 hours and holding for 70 hours, then cooling over a 2 hour period. The rods were irradiated with 1.0 mRad from a Co-60 source. The rods were sliced into buttons and then machined and polished into 8 mm diameter lenses. Five lenses for each UV absorber formulation, Example 7a through 7f, were measured for UV absorption. The results were averaged and listed above.

EXAMPLE NO. 8

HEMA-Based UV Comparison

EXAMPLE 8(a)

A polymer base was prepared according to the following shown on a total wet basis:

HEMA-49.491%, EOEMA-4.97%, APM-0.08%, IPA-42.10%, EDMA-1.20%, MAA-4.059%, Vazo 52-0.028%, BZT-0.82%. This amount of BZT added is equivalent to 1.42% by weight of dry polymer. The resulting contact lenses had average transmittance values of 6.8% for 280–315 nm (UVB) and 2.1% for 316–380 nm (UVA). At 280 nm, the transmittance was 18.72%, which is equivalent to 0.73 Absorbance units.

EXAMPLE 8(b)

To the same polymer base as above 0.75% BZT and 0.79% BP on a dry basis was added, for a total of 1.54% UV absorbers on a dry weight basis. The resulting contact lenses had average transmittance values of 1.03% for 280–315 nm (UVB) and 4.07% for 316–380 nm (UVA). At 280 nm, the transmittance was 1.89%, which is equivalent to 1.72 Absorbance units.

COMPARISON OF EXAMPLES 8(a) AND 8(b)

Based on the results of 8(a), one can calculate the amount of BZT needed to obtain the same absorbance as was obtained in 8(b) using a mixture of BZT and BP. Using Beer's Law, the following equation is used % BZT (8a)× Abs(8b)/Abs(8a)=% BZT. Plugging in the numbers as follows: 1.42%×1.72/0.73 equals 3.35% BZT on a dry basis is calculated to obtain 1.89% transmittance at 280 nm. This is more than double the total amount by weight of combined UV absorbers used in Ex. 8(b).

EXAMPLE 8(c)

To the same polymer base as above 0.64% BZT and 0.1.39% BP on a dry basis was added, for a total of 2.03% UV absorbers on a dry weight basis. The resulting contact lenses had average transmittance values of 0.15% for 280–315 nm (UVB) and 3.67% for 316–380 nm (UVA). At 280 nm, the transmittance was 0.249%, which is equivalent to 2.62 Absorbance units.

COMPARISON OF EXAMPLES 8(a) AND 8(c)

Based on the results of 8(a), one can calculate the amount of BZT needed to obtain the same absorbance as was obtained in 8(c) using a mixture of BZT and BP. Again, using Beer's Law, one can calculate the amount of BZT needed as follows: 1.42%×2.62/0.73 equals 5.10% BZT on a dry basis is calculated to obtain 1.89% transmittance at 280 nm. This is more than 2.5 times the total amount by weight of combined UV absorbers used in Ex. 8(c).

EXAMPLE NO. 9
DMA/MMA-Based Lenses Comparative Example

In this example, UV-blocking monomers, BP and BZT, were used individually and in combination at the same levels to make molded experimental RGP lenses. For comparison, the averaged percent transmission data in the UVA and UVB range are reported below.

Target Formulations for Examples 9a and 9b

| Lens | UV IMT | UV Blocker | DMA/MMA Ratio | IMT | AIBN wt % | BP wt % | BZT wt % |
|---|---|---|---|---|---|---|---|
| 9a-1 | D&C* | BP | 1.07:1 | 75 ppm | 0.30 | 1.00 | |
| 9b-1 | D&C | BZT | 1:07:1 | 75 ppm | 0.30 | | 1.50 |
| 9a-2 | APM** | BP | 1.07:1 | 75 ppm | 0.30 | 1.00 | |
| 9b-2 | APM | BZT | 1.07:1 | 75 ppm | 0.30 | | 1.50 |

*D&C = D&C Green Number 6
*APM = A dispersion of phthalocyanine green in DMA/MMA

| Ingredient | Lens 9c-1 (Actual Wt. (g)) | Lens 9c-2 (Actual Wt. (g)) |
|---|---|---|
| MMA | 36.774 | 48.774 |
| MMA/D + C | 10.003 | 10 |
| DMA | 50.078 | 40.078 |
| BP | 1.001 | 1.003 |
| BZT | 1.505 | 1.506 |
| AZBN | 0.304 | 0.301 |
| EGDMA | 0.358 | 0.355 |

Lens Preparation

Lenses were filled on a LCCM type filler/sealer using hand filling of cavities. Lenses were hydrated and processed as follows:

Cure was carried out in a Gallenkamp oven as follows:

Nitrogen purge for 1 hour at ambient conditions

Ramp to 72° C. at 45° C. hour

Dwell at 72° C. for one hour

Ramp to 124° C. at 45° C. hour

Dwell at 124° C. for 48 minutes

Off

This polymerization is a thermal cure using AZBN (or AIBN, Vazo 64, etc.). The lenses were hydrated after polymerization.

The UV/V spectra was run using a Perkin-Elmer spectrophotometer fitted with an integrating sphere detector. The percent transmissions of the different lens formulations were averaged over the UVA and UVB region and listed in categories according to UV monomer composition, as shown below.

UV Transmittance Comparison

| Example | UV monomer(s) (dry weight basis) | Ave % T (280–315 nm) | Ave % T (316–380 nm) |
|---|---|---|---|
| 9a | 1% BP | 1.6 | 26.7 |
| 9b | 1.5% BZT | 4.7 | 7.7 |
| 9c | 1% BP & 1.5% BZT | 0.1 | 0.25 |

The data above show in a crisp way the benefit derived from combining UV blockers. Besides the predictable "covering of holes" in the UV spectrum, it is observed that an enhanced reduction in percent transmission is obtained, greater than might have been expected.

The invention has been described with reference to specific embodiments, which are provided only for exemplification and are not to be construed as limiting the scope of the invention as defined by the appended claims.

What is claimed is:

1. A contact lens comprising a hydrogel polymer formed by polymerizing one or more monomers suitable for use in making such lenses, and copolymerizing effective amounts of a first ultraviolet absorber and a second ultraviolet absorber, wherein said first UV absorber is a benzotriazole compound represented by the formula:

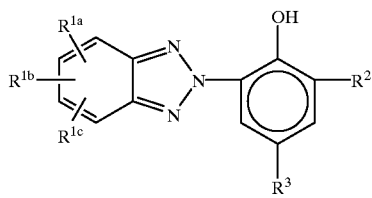

where $R^{1a}$, $R^{1b}$, and $R^{1c}$ are independently hydrogen, halogen, $C_1$–$C_6$ straight or branched chain alkoxy group, aryl or substituted aryl; $R^2$ is hydrogen or lower alkyl, aryl or substituted aryl; $R^3$ is hydrogen, lower alkyl, aryl, substituted aryl, or $R^4$—$R^5$—$R^6$, where $R^4$ is an oxygen or is absent, $R^5$ is a linking group selected from —$(CH_2)_nO$—, —$CH(CH_3)CH_2O$—, —$CH_2CH(CH_3)O$—, —$(CH_2)_nOCH_2$—, —$CH(CH_3)CH_2OCH_2$—, or —$CH_2CH(CH_3)OCH_2$— group, or is absent; $R^6$ is acrylate, methacrylate, styrene or vinyl; and n is 2 or 3;

wherein the second UV absorber is a substituted 2-hydroxy-benzophenone according to the formula:

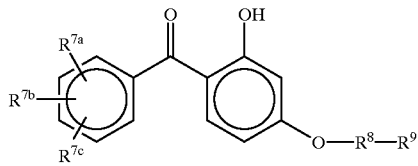

where $R^{7a}$, $R^{7b}$, and $R^{7c}$ are independently hydrogen, halogen, $C_1$–$C_6$ straight or branched chain alkoxy group, aryl or substituted aryl; $R^8$ is a linking group selected from alkyl, —$(CH_2)_mO$—, —$CH(CH_3)CH_2O$—, —$CH_2CH(CH_3)O$—, —$(CH_2)_mOCH_2$—, —$CH(CH_3)CH_2OCH_2$—, or —$CH_2CH(CH_3)OCH_2$— group, or is absent; and $R^9$ is alkyl, acrylate, methacrylate, styrene or vinyl; and m is 2 or 3; and wherein the total amount of UV absorbers present is between about 0.8 and about 3.0 percent dry weight of the lens material, and the lens has an average UV transmittance of less than 10 percent in the UVA range and an average UV transmittance of less than 1.0 percent in the UVB range.

2. The lens of claim 1 wherein the first UV absorber is a benzotriazole compound represented by the formula:

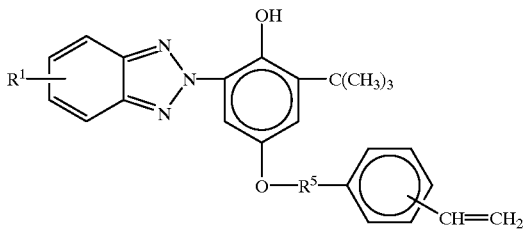

where $R^1$ is hydrogen, halogen, $C_1$–$C_6$ straight or branched chain alkoxy group, aryl or substituted aryl; and $R^5$ is a linking group selected from —$(CH_2)_nO$—, —$CH(CH_3)CH_2O$—, —$CH_2CH(CH_3)O$—, —$(CH_2)_nOCH_2$—, —$CH(CH_3)CH_2OCH_2$—, or —$CH_2CH(CH_3)OCH_2$— group, or is absent; and n is 2 or 3.

3. The lens of claim 2 wherein $R^1$ is methoxy.
4. The lens of claim 2 wherein $R^5$ is —$(CH_2)_nOCH_2$—.
5. The lens of claim 4 wherein n is 3.
6. The lens of claim 1 wherein the second UV absorber is 2-hydroxy-4-acryloxyethoxy-benzophenone, 2-hydroxy-4-methacryloxy-benzophenone, or 2-hydroxy-4-methoxy-benzophenone.
7. The lens of claim 6 wherein the second UV absorbing compound is 2-hydroxy-4-acryloxyethoxy-benzophenone.
8. The lens of claim 1 wherein the average UV transmittance is less than 1.0 percent in the UVA range.
9. The lens of claim 1, wherein the first UV absorber and the second UV absorber are present in a ratio of between about 3:1 and 1:3 by weight.
10. The lens of claim 1, wherein the total amount of UV absorbers present is between about 1.0 and about 2.0 percent by dry weight of lens material.
11. The lens of claim 1, wherein the amount of the first UV absorber present is less than 0.5 percent by dry weight of lens material so as to minimize any observable yellowish tint.
12. A UV-absorbing transparent hydrogel polymer having copolymerized therein at least two UV absorbing compounds, wherein the first UV absorber is a benzotriazole compound represented by the formula:

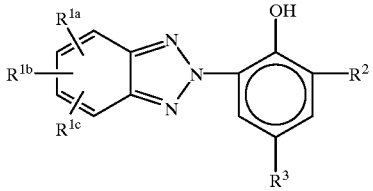

where $R^{1a}$, $R^{1b}$, and $R^{1c}$ are independently hydrogen, halogen, $C_1$–$C_6$ straight or branched chain alkoxy group, aryl or substituted aryl; $R^2$ is hydrogen, lower alkyl, aryl or substituted aryl; $R^3$ is hydrogen, lower alkyl, aryl, substituted aryl, or $R^4$—$R^5$—$R^6$, where $R^4$ is an oxygen or is absent, $R^5$ is a linking group selected from —$(CH_2)_nO$—, —$CH(CH_3)CH_2O$—, —$CH_2CH(CH_3)O$—, —$(CH_2)_nOCH_2$—, —$CH(CH_3)CH_2OCH_2$—, or —$CH_2CH(CH_3)OCH_2$— group, or is absent; $R^6$ is acrylate, methacrylate, styrene or vinyl; and n is 2 or 3;

wherein the second UV absorber is a substituted 2-hydroxy-benzophenone according to the formula:

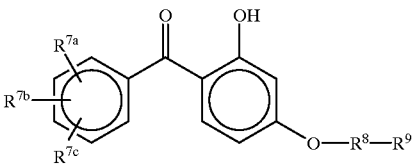

where $R^{7a}$, $R^{7b}$, and $R^{7c}$ are independently hydrogen, halogen, $C_1$–$C_6$ straight or branched chain alkoxy group, aryl or substituted aryl; $R^8$ is a linking group selected from alkyl, —$(CH_2)_mO$—, —$CH(CH_3)CH_2O$—, —$CH_2CH(CH_3)O$—, —$(CH_2)_mOCH_2$—, —$CH(CH_3)CH_2OCH_2$—, or —$CH_2CH(CH_3)OCH_2$— group, or is absent; and $R^9$ is alkyl, acrylate, methacrylate, styrene or vinyl; and m is 2 or 3; and wherein the total amount of UV absorbers present is between about 0.8 and about 3.0 percent dry weight of the lens material, and the polymer has sufficient UV absorption such that a hydrogel contact lens prepared from the polymer has an average UV transmittance of less than 10 percent in the UVA range and an average UV transmittance of less than 1.0 percent in the UVB range.

13. The polymer of claim 12 wherein the first UV absorber is a benzotriazole compound represented by the formula:

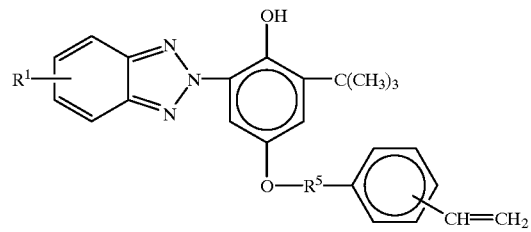

where $R^1$ is hydrogen, halogen, $C_1$–$C_6$ straight or branched chain alkoxy group, aryl or substituted aryl; and $R^5$ is a linking group selected from —$(CH_2)_nO$—, —$CH(CH_3)CH_2O$—, —$CH_2CH(CH_3)O$—, —$(CH_2)_nOCH_2$—, —$CH(CH_3)CH_2OCH_2$—, or —$CH_2CH(CH_3)OCH_2$— group, or is absent; and n is 2 or 3.

14. The polymer of claim 13 wherein $R^1$ is methoxy.
15. The polymer of claim 13 wherein $R^5$ is —$(CH_2)_nOCH_2$—.
16. The polymer of claim 15 wherein n is 3.
17. The polymer of claim 12 wherein the second UV absorber is 2-hydroxy-4-acryloxyethoxy-benzophenone, 2-hydroxy-4-methacryloxy-benzophenone, or 2-hydroxy-4-methoxy-benzophenone.
18. The polymer of claim 12 wherein the second UV absorbing compound is 2-hydroxy-4-acryloxyethoxy-benzophenone.
19. The polymer of claim 15 wherein the average UV transmittance is less than 1.0 percent in the UVA range.
20. The contact lens of claim 1 wherein the total amount of UV absorbers is present in an amount of more than 1.0 percent and less than about 3.0 percent.
21. The polymer of claim 12 wherein the total amount of UV absorbers is present in an amount of more than 1.0 percent and less than about 3.0 percent.

* * * * *